(12) United States Patent
Duroux

(10) Patent No.: US 6,259,412 B1
(45) Date of Patent: Jul. 10, 2001

(54) VEHICLE EXTERIOR MIRROR WITH ANTENNA

(76) Inventor: Bernard Duroux, 19 Domaine de la Boisssiere, 78890 Garancieres (FR)

( * ) Notice: Subject to any disclaimer, the term of this patent is extended or adjusted under 35 U.S.C. 154(b) by 0 days.

(21) Appl. No.: 09/404,101

(22) Filed: Sep. 23, 1999

(30) Foreign Application Priority Data

Sep. 23, 1998 (GB) .................................................. 9820622

(51) Int. Cl.[7] .................................................. H01Q 1/32
(52) U.S. Cl. ........................... 343/713; 343/711; 343/712
(58) Field of Search ........................... 343/700 MS, 711, 343/712, 713

(56) References Cited

U.S. PATENT DOCUMENTS

| 4,210,357 | 7/1980 | Adachi . | |
|---|---|---|---|
| 4,868,915 | * 9/1989 | Anderson et al. | 340/825.31 |
| 5,925,272 | * 7/1999 | Lang et al. | 219/219 |
| 6,081,237 | * 6/2000 | Sato et al. | 343/713 |

FOREIGN PATENT DOCUMENTS

| 1 590 824 | 6/1981 | (GB) . |
| 2 157 633 | 10/1985 | (GB) . |
| WO 91/00626 | 1/1991 | (WO) . |
| WO 95/19598 | 7/1995 | (WO) . |
| WO 97/21127 | 6/1997 | (WO) . |
| WO 97/32355 | 9/1997 | (WO) . |

* cited by examiner

Primary Examiner—Don Wong
Assistant Examiner—Shih-Chao Chen
(74) Attorney, Agent, or Firm—Jones, Day, Reavis & Pogue

(57) ABSTRACT

An exterior rear view mirror for a motor vehicle comprises a case containing a reflective member and an antenna, consisting of an electrically conductive layer on a surface of the case, for transmitting and/or receiving radio frequency electromagnetic radiation. The electrically conductive layer has at least one zone having its periphery shaped in accordance with the frequency of said electromagnetic radiation.

37 Claims, 2 Drawing Sheets

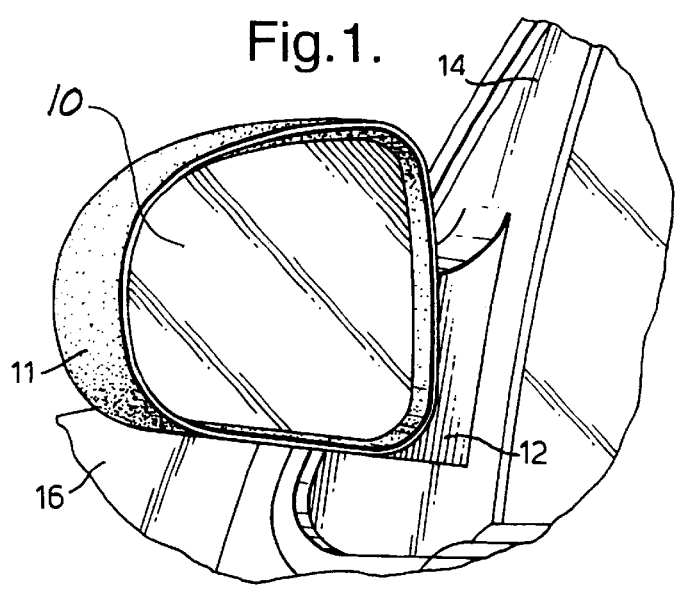
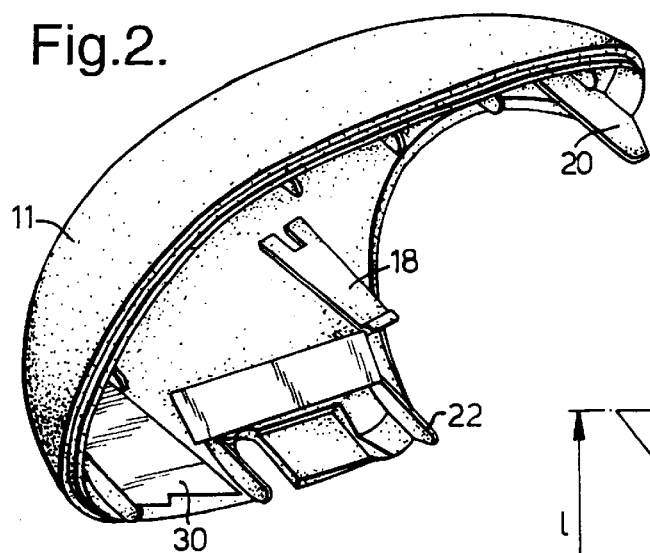
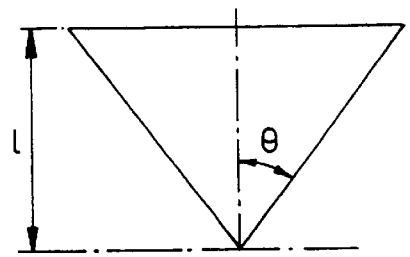
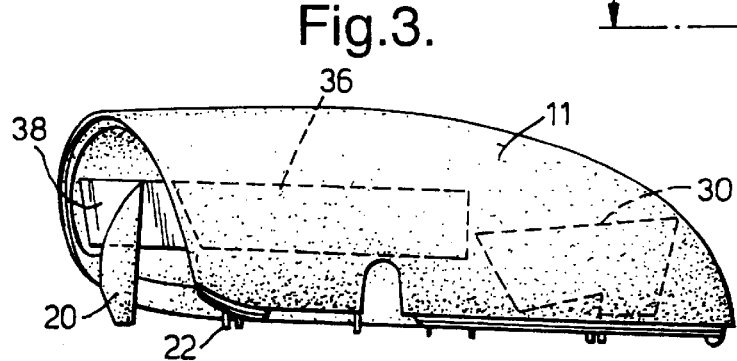

VEHICLE EXTERIOR MIRROR WITH ANTENNA

FIELD

This invention relates to an exterior rear view mirror for a motor vehicle comprising a case containing a mirror glass or other reflective member and an antenna for transmitting and/or receiving radio frequency electromagnetic radiation comprising an electrically conductive layer on a surface of the case.

RELATED ART

An exterior mirror of this type is disclosed in GB-A-1590824. The case comprises a body moulded from plastics material having a bright copper layer deposited on substantially the whole of its outer surface for receiving a chromium-plated outer layer. The bright copper layer also serves as an antenna.

SUMMARY OF THE INVENTION

According to the invention, in a rear-view mirror assembly of the type described above, the antenna comprises an electrically conductive layer on a surface of a rigid member forming part of the mirror assembly.

BRIEF DESCRIPTION OF THE DRAWINGS

FIG. 1 is a perspective view of a vehicle exterior mirror in accordance with the invention;

FIG. 2 is a perspective view of the case of the mirror shown in FIG. 1;

FIG. 3 is a perspective view of the mirror case shown in FIG. 2, from a different angle;

FIG. 7 is a diagram illustration dimensions of a theoretical conical antenna.

DETAILED DESCRIPTION OF THE PREFERRED EMBODIMENT

Figure 4:
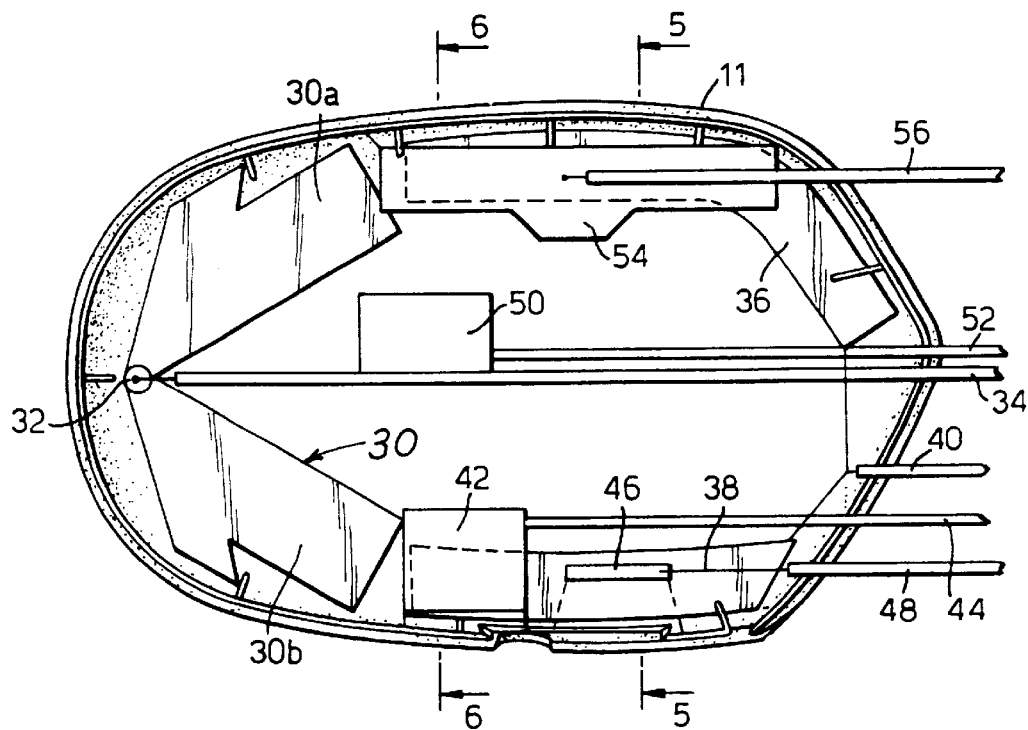
FIG. 4 is a view into the mirror case of FIGS. 2 and 3 through the opening in which the mirror glass would be mounted.
Figure 5:
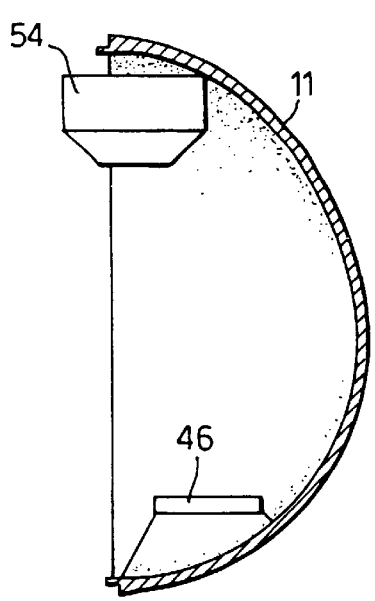
FIG. 5 is a cross-sectional view taken on the line 5—5 in FIG. 4.
Figure 6:
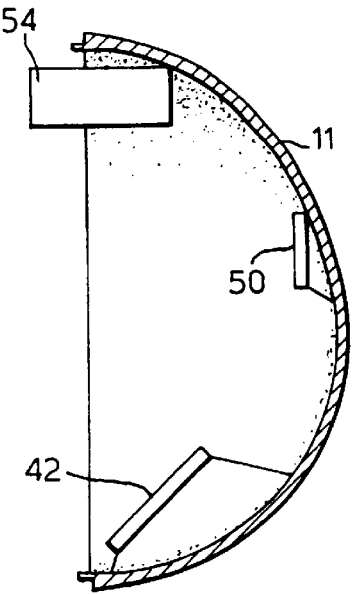
FIG. 6 is a cross-sectional view taken on the line 6—6 in FIG. 4.

FIG. 1 shows a vehicle rear-view mirror comprising a reflective member 10 fitted in a case 11, which is mounted on a bracket 12, which is secured to one of the front doors 14 of a motor car 16. As can be seen from FIG. 2, the case 11 has a clip 18 and guides 20 and 22 by means of which it is secured to an internal frame member (not shown) of the mirror assembly. In accordance with the invention, a first metallic foil element 30 is secured by adhesive to the inside surface of the outboard end of the case 11. As can best be seen from FIG. 4, the element 30 is formed in two symmetrical halves 30a and 30b interconnected by a link part 32 which is connected by a coaxial cable 34 to a mobile telephone (not shown). The two symmetrical halves 30a and 30b approximate to a conical antenna. FIG. 7 shows a cone of half cone angle $\theta$ and length l. Theoretically l should be equal to wavelength $\lambda$ of the radio signals (i.e. the speed of light divided by the centre frequency). In practice, acceptable results are achieved if l is three tenths of the theoretical value.

The theoretical formula for the feed-point impedance (Zk) of a conical antenna is:

$$Zk = (Zo/\pi) \text{Ln cot } g(\theta/2)$$

where Zo is the free space impedance (377 ohms in air) and "Ln cot g" means "logarithmic cotangent". 30° is a realistic practical value for $\theta$.

The relationship between the angle $\theta$ and the impedance of the antenna is linear. Good reception can be obtained if the actual feed-point impedance is between half and twice its optimum value. Provided this condition is met, it can be shown from FIGS. 8–15 on page 355 of John D Kraus, "Antennas", published by McGraw Hill, ISBN 0-07-0354-22-7, that, because the curve is practically linear in the area used, a practical optimised value Zo for the actual feed-point impedance is:

$$Zo = 1500(l/\lambda) - 113 \cdot 3$$

It follows that the length l of the foil elements 30a and 30b and the half-cone angle $\theta$ is:

$$(Zo/\pi) \text{Ln Cot } g\theta/2 = 1500(l/\lambda) - 113 \cdot 3$$

In practice, the length l of foil element may be about three tenths of the wavelength $\lambda$.

Two other foil elements 36 and 38 that are a mirror image of one another are secured by adhesive to the central and inboard parts of the interior surface of the case 11. These foil elements 36 and 38 are connected by a cable 40 to a radio broadcast receiver, for example an FM radio receiver (not shown).

In addition to the above two antennae, a third antenna 42 is connected by a cable 44 to a transponder (not shown) for an automatic road toll charging system; a fourth antenna 46 is connected by a cable 48 to a controller for the central door locking system for the car 16. Another antenna 50, positioned in the centre of the mirror case 11 is connected by a cable 52 to a digital radio receiver (not shown) while a further antenna 54 is connected by a cable 56 to a GPS receiver (also not shown).

The antennae 42, 46, 50 and 54 are rigid antennae mounted within the case 11. Although the various cables 34, 40, 44, 48, 52 and 56 are shown as parallel to one another, in practice they are gathered together so as to extend through the interior of the bracket 12 into the interior of the car 16, where they are connected to their respective transmitters and/or receivers.

Antennae comprising metal inserts moulded into the case 11 may replace the foil antennae 30, 36 and 38. Another alternative is for the case or cover member to be formed as co-moulding of two different plastics material, only one of which will accept surface metallisation. A layer of metal is then deposited on this part to serve as the antennae.

If the case has a separate decorative exterior cover member of the type described in European Patent Application No. 98302674.1, the electrically conductive layer may be formed either on the inner surface of such cover member or on that part of the outer surface of the mirror case which is enclosed by the cover member.

Alternatively or additionally one or more antennae may take the form of a conductive layer on part of the mounting for the mirror glass or other reflective member.

The mirror assembly may in addition incorporate other antennae for receiving GPS signals, remote operation of the car door locks and transponders for automatic road toll accounting systems. Some of these additional antennae may be formed as self-supporting rigid members.

What is claimed is:

1. An exterior rear view mirror for a motor vehicle comprising a mirror case of non-metallic plastic material, said mirror case having an interior, an interior surface and a front opening, a reflective member mounted on said mirror case in said front opening, a plurality of different antennas mounted in said mirror case independent of and unattached to said reflective member, each of said plurality of different antennas being for receiving and/or transmitting radio frequency signals of different frequencies, and at least one of said antennas being an electrically conductive layer on said interior surface.

2. The rear view mirror according to claim 1, wherein the electrically conductive layer comprises foil secured to said mirror case by adhesive.

3. The rear view mirror according to claim 1 including an exterior cover member for said mirror case and wherein the electrically conductive layer comprises a metal insert molded into one of the mirror case and cover member.

4. The rear view mirror according to claim 1, wherein the mirror case is formed as a co-moulding of two different plastic materials, only one of which is capable of accepting surface metallization, and the conductive layer comprises metallization deposited on the plastic material that is capable of accepting surface metallization.

5. The rear view mirror according to claim 1 wherein one of said antennas is for transmitting and receiving mobile telephone signals.

6. The rear view mirror according to claim 1 wherein one of said antennas is for receiving FM radio signals.

7. The rear view mirror according to claim 1 wherein one of said antennas is for receiving global positioning system signals.

8. The rear view mirror according to claim 1 having wherein said mirror is on a vehicle having electrically operated door locks and one of said antennas is for remote operation of the car door locks.

9. The rear view mirror according to claim 1 wherein one of said antennas is for transmitting and/or receiving signals for an automatic road toll accounting system.

10. An exterior rear view mirror for a motor vehicle comprising a mirror case of non-metallic plastic material containing a reflective member and a plurality of antennas for transmitting and/or receiving radio frequency electromagnetic radiation of a plurality of predetermined different frequencies, said mirror case having a surface and said antennas including a plurality of independent electrically conductive layers on said surface of said mirror case, said electrically conductive layers being independent of and unattached to said reflective member, and at least one of said electrically conductive layers having a physical shape that includes an antenna dimension that is proportional to one of said predetermined frequencies of said electromagnetic radiation.

11. The rear view mirror according to claim 10 said of one said predetermined frequencies has a wavelength and said antenna dimension is the antenna length which is substantially equal to about three tenths of said wavelength.

12. The rear view mirror according to claim 10 wherein said mirror case includes a curved surface portion on which at least one of said electrically conductive layers is located, said curved surface portion being shaped to provide said one electrically conductive layer with a physical shape of a part-conical antenna, the half cone angle θ of which is related to the length l, the feed-point impedance Zo and the wavelength λ by the formula:

$$(Zo/\pi) \ln \cot g\theta/2 = 1{,}500(l/\lambda) - 113.3$$

13. The rear view mirror according to claim 10 wherein the mirror case has an inside surface and at least one of the electrically conductive layers is located on the inside surface of the mirror case.

14. The rear view mirror according to claim 10 wherein the mirror case includes an exterior cover member with an inner surface and at least one of the electrically conductive layers is applied to the inner surface of said exterior cover member.

15. The rear view mirror according to claim 10 wherein said mirror case has an outer surface, an exterior cover member for said mirror case, and at least one of the electrically conductive layers being located on a part of the outer surface of the mirror case which is enclosed by the cover member.

16. The rear view mirror according to claim 10 wherein at least one of the electrically conductive layers comprises foil secured to said mirror case by adhesive.

17. The rear view mirror according to claim 10 including an exterior cover member for said mirror case and wherein at least one of the electrically conductive layers comprises a metal insert molded into one of the mirror case and cover member.

18. The rear view mirror according to claim 10 wherein the mirror case is formed as a co-moulding of two different plastic materials, only one of which is capable of accepting surface metallization, and at least one of the conductive layers comprises metallization deposited on the plastic material that is capable of accepting surface metallization.

19. The rear view mirror according to claim 10 wherein one of said antennas is for transmitting and receiving mobile telephone signals.

20. The rear view mirror according to claim 10 wherein one of said antennas is for receiving FM radio signals.

21. The rear view mirror according to claim 10 wherein one of said antennas is for receiving global positioning system signals.

22. The rear view mirror according to claim 10 having wherein said mirror is on a vehicle having electrically operated door locks and one of said antennas is for remote operation of the car door locks.

23. The rear view mirror according to claim 10 wherein one of said antennas is for transmitting and/or receiving signals for an automatic road toll accounting system.

24. An exterior rear view mirror for a motor vehicle comprising a mirror case of non-metallic plastic material containing a reflective member and a first antenna for transmitting and/or receiving radio frequency electromagnetic radiation of a predetermined frequency, said mirror case having a surface and said first antenna comprising an electrically conductive layer on said surface of said mirror case, said electrically conductive layer having a physical shape that includes an antenna dimension that is proportional to said predetermined frequency of said electromagnetic radiation, and a second antenna located within said mirror case, said second antenna being a self-supporting rigid member.

25. The rear view mirror according to claim 24 wherein said predetermined frequency has a wavelength and said antenna dimension is the antenna length which is substantially equal to about three tenths of said wavelength.

26. The rear view mirror according to claim 24 wherein said mirror case includes a curved surface portion on which said electrically conductive layer is located, said curved surface portion being shaped to provide said electrically conductive layer with a physical shape of a part-conical antenna, the half cone angle θ of which is related to the length l, the feed-point impedance Zo and the wavelength λ by the formula:

$$(Zo/\pi) \operatorname{Ln} \operatorname{Cot} g\theta/2 = 1,500(l/\lambda) - 113.3$$

27. The rear view mirror according to claim 24 wherein the mirror case has an inside surface and the electrically conductive layer is located on the inside surface of the mirror case.

28. The rear view mirror according to claim 24 wherein the mirror case has an exterior cover member with an inner surface and the electrically conductive layer is applied to the inner surface of said exterior cover member.

29. The rear view mirror according to claim 24 wherein said mirror case has an outer surface, an exterior cover member for said mirror case, and the conductive layer being located on a part of the outer surface of the mirror case which is enclosed by the cover member.

30. The rear view mirror according to claim 24 wherein the electrically conductive layer comprises foil secured to said mirror case by adhesive.

31. The rear view mirror according to claim 24 including an exterior cover member for said mirror case and wherein the electrically conductive layer comprises a metal insert molded into one of the mirror case and cover member.

32. The rear view mirror according to claim 24 wherein the mirror case is formed as a co-moulding of two different plastic materials, only one of which is capable of accepting surface metallization, and the conductive layer comprises metallization deposited on the surface of the plastic material that is capable of accepting metallization.

33. The rear view mirror according to claim 24 wherein one of said antennas is for transmitting and receiving mobile telephone signals.

34. The rear view mirror according to claim 24 wherein one of said antennas is for receiving FM radio signals.

35. The rear view mirror according to claim 24 wherein one of said antennas is for receiving global positioning system signals.

36. The rear view mirror according to claim 24 wherein said mirror is on a vehicle having electrically operated door locks and one of said antennas is for remote operation of the car door locks.

37. The rear view mirror according to claim 24 wherein one of said antennas is for transmitting and/or receiving signals for an automatic road toll accounting system.

* * * * *